United States Patent [19]

Idel et al.

[11] Patent Number: 5,231,124
[45] Date of Patent: Jul. 27, 1993

[54] STABILIZED THERMOPLASTIC MOLDING COMPOSITIONS

[75] Inventors: Karsten-Josef Idel, Krefeld; Jürgen Kirsch, Cologne; Friedemann Paul, Bergisch Gladbach; Lothar Meier, Sprockhoevel; Hans-Georg Gehrke, Odenthal, all of Fed. Rep. of Germany

[73] Assignee: Bayer Aktiengesellschaft, Leverkusen Bayerwerk, Fed. Rep. of Germany

[21] Appl. No.: 981,671

[22] Filed: Nov. 25, 1990

Related U.S. Application Data

[63] Continuation of Ser. No. 447,772, Dec. 8, 1989, abandoned.

[30] Foreign Application Priority Data

Dec. 15, 1988 [DE] Fed. Rep. of Germany ....... 3842219

[51] Int. Cl.$^5$ .............................................. C08K 5/527
[52] U.S. Cl. ..................................... 524/109; 524/117
[58] Field of Search ................................ 524/109, 117

[56] References Cited

U.S. PATENT DOCUMENTS

| | | | |
|---|---|---|---|
| 3,864,428 | 2/1975 | Nakamura et al. | 260/873 |
| 3,919,353 | 11/1975 | Castelnuovo et al. | 260/873 |
| 4,323,501 | 4/1982 | Eimers et al. | 260/333 |
| 4,381,359 | 4/1983 | Idel et al. | 524/117 |
| 4,522,979 | 6/1985 | Chung et al. | 525/66 |
| 4,554,314 | 11/1985 | Chung et al. | 525/67 |
| 5,064,885 | 11/1991 | Muller et al. | 524/117 |

FOREIGN PATENT DOCUMENTS

| | | |
|---|---|---|
| 0105388 | 4/1984 | European Pat. Off. . |
| 2615341 | 10/1972 | Fed. Rep. of Germany . |
| 2510463 | 3/1975 | Fed. Rep. of Germany . |

*Primary Examiner*—Veronica P. Hoke
*Attorney, Agent, or Firm*—Joseph C. Gil; Aron Preis; Richard E. L. Henderson

[57] ABSTRACT

Thermoplastic molding composition based on polyalkylene terephthalate, aromatic polycarbonate and, optionally, rubber-elastic polymer, which are provided with special phosphorus stabilizers, show good paintability and paint adhesion and, even after painting, show favorable low-temperature toughness and heat resistance.

6 Claims, No Drawings

STABILIZED THERMOPLASTIC MOLDING COMPOSITIONS

This application is a continuation of application Ser. No. 07/447,772 filed Dec. 8, 1989 now abandoned.

This invention relates to thermoplastic molding compositions based on polyalkylene terephthalate, aromatic polycarbonate and, optionally, rubber-elastic polymer, which are provided with certain stabilizers, and to the moldings produced therefrom.

SUMMARY OF THE INVENTION

Molding composition comprising polyalkylene terephthalate, polycarbonate and optionally a rubber elastic polymer were found to be imparted improved toughness and thermal resistance as well as paintability and paint adhesion upon the incorporation therewith a combination of specific phosphorus compounds.

Mixtures of polyalkylene terephthalate and aromatic polycarbonate and mixtures of polyalkylene terephthalate, aromatic polycarbonate and rubber-elastic polymers are known in principle (DE 2 348 377, DE 2 343 609 and EP-A-105 388). Although these known mixtures have many desirable properties, they do not satisfy certain requirements in regard to paintability for obtaining a good surface and good paint adhesion. In addition, the high level of toughness and heat resistance at elevated processing temperatures or over prolonged residence times originally achieved is reduced during the molding process. In addition, the moldings often undergo a reduction in toughness and heat resistance after painting.

Accordingly, an object of the present invention is to provide thermoplastic molding compounds which show high toughness and heat resistance and, above all, combine better paintability with good paint adhesion.

It has now surprisingly been found that the addition of a combination of particular phosphorus compounds renders molding compounds which show distinctly improved paintability and paint adhesion. In addition, the painted and unpainted moldings show considerably more favorable toughness at low temperatures and heat resistance.

Accordingly, the present invention relates to thermoplastic molding compositions comprising A. from 10 to 99, preferably from 20 to 80 and more preferably from 30 to 70 parts by weight polyalkylene terephthalate, B. from 5 to 80 and more preferably from 10 to 60 parts by weight aromatic polycarbonate, C. optionally up to 30 and preferably from 1 to 28 parts by weight rubber-elastic polymer and D. from 0.01 to 0.5 part by weight of a phosphite compound corresponding to formula (I)

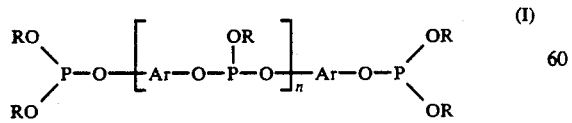

in which

R represents $C_1$-$C_{18}$ alkyl, $C_6$-$C_{15}$ aryl, $C_5$ or $C_6$ cycloalkyl, $C_7$-$C_8$ aralkyl or a $C_1$-$C_{18}$ monohydric alcohol radical containing at least one oxetanyl group, with the proviso that at least one of the substituents R represents a $C_1$-$C_{18}$ mono alcohol radical containing oxetanyl groups, Ar is a radical corresponding to formula (II)

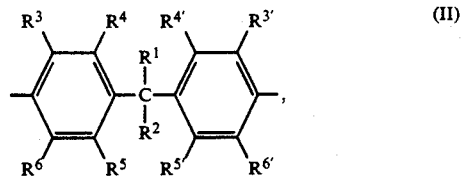

in which $R^1$ and $R^2$ may be the same or different and represent hydrogen, $C_1$-$C_{18}$ alkyl or mono- or polynuclear $C_6$-$C_{18}$ aryl and $R^3$, $R^{3'}$, $R^4$, $R^{4'}$, $R^5$, $R^{5'}$, $R^6$ and $R^{6'}$ may be the same or different and represent hydrogen, $C_1$-$C_{18}$ alkyl, $C_3$-$C_6$ cycloalkyl, mono- or poly-nuclear $C_6$-$C_{18}$ aryl, $C_1$-$C_{18}$ alkoxy, $C_1$-$C_{18}$ aryloxy or halogen, and in which n is O or an integer of from 1 to 10 and preferably 0, 1 or 2, E. from 0.01 to 0.5 part by weight of a phosphorous acid ester corresponding to formula (III)

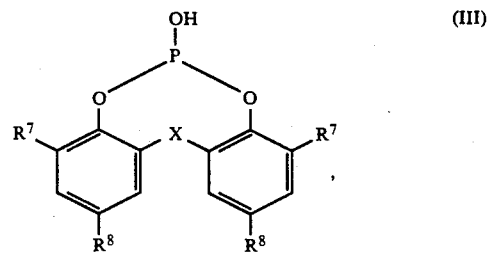

in which $R^7$ and $R^8$ may be the same or different and represent $C_1$-$C_9$ alkyl, $C_5$ or $C_6$ cycloalkyl, $C_7$-$C_9$ aralkyl or $C_6$-$C_{10}$ aryl and X represents —S— or $R^9$—CH with $R^9$ standing for hydrogen, $C_1$-$C_6$ alkyl or $C_5$ cycloalkyl, and F. optionally up to 1 part, especially from 0.1 to 1 part by weight nucleating agents, pigments and/or mold release agents.

Examples of alkyl radicals in formulae (I), (II) and (III) include methyl, ethyl, propyl and isononyl, examples of aralkyl radicals are

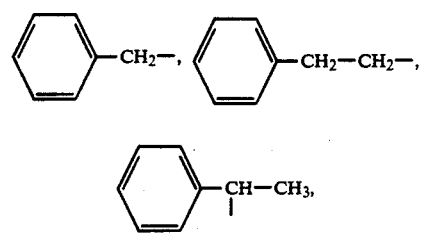

examples of cycloalkyl radicals are cyclopentyl and cyclohexyl;

examples of aryl radicals are phenyl and naphthyl;

examples of alkoxy radicals are methoxy, ethoxy, propoxy, butoxy;

examples of aryloxy radicals are phenoxy and naphthoxy;

examples of halogens are fluorine, chlorine, bromine, preferably fluorine and chlorine.

Particularly preferred phosphite compounds (D) corresponding to formula (I) are those in which n=O, Ar represents

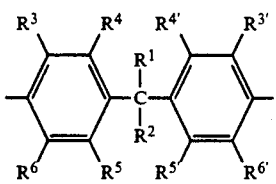

with $R^1$ and $R^2$ standing for $CH_3$ and $R^3$, $R^{3'}$, $R^4$, $R^{4'}$, $R^5$, $R^{5'}$, $R^6$, and $R^{6'}$ for hydrogen [phosphorous acid (1-methyl ethylene)-di-4,1-phenylenetetrakis-(3-ethyl-(3-oxethanyl)methyl)-ester].

The phosphorous acid esters of formula (III) preferably used as component (E) are those in which $R^7$ and $R^8$ each represents a benzyl, α-methylbenzyl, α, α-dimethylbenzyl, methyl, ethyl, isopropyl, tert.-butyl, tert.-amyl, isononyl, cyclopentyl or cyclohexyl radical and X represents

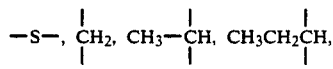

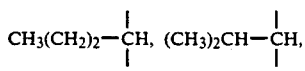

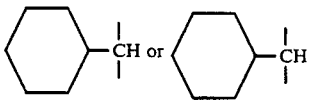

It is particularly preferred to use the phosphorous acid ester of formula (III), in which X represents methylene, $R^7$ represents cyclohexyl and $R^8$ represents methyl [4,8-dicyclohexyl-6-hydroxy-2,10-dimethyl-12H-dibenzo(d,g) (1,3,2-dioxaphosphocine].

The phosphite compounds corresponding to formula (I) may be prepared in known manner by transesterification of corresponding phosphites with diphenols (derived from formula (II)), cf. DE 25 10 463).

The phosphorous acid esters corresponding to formula (III) may be prepared in known manner by reaction of triphenyl phosphite with corresponding dihydroxy compounds in the presence of water (cf. for example DE 29 29 229).

Polyalkylene terephthalates A in the context of the invention are reaction products of aromatic dicarboxylic acids or reactive derivatives thereof (for example dimethyl esters or anhydrides) and aliphatic, cycloaliphatic or araliphatic diols and mixtures of these reaction products.

Preferred polyalkylene terephthalates A may be prepared from terephthalic acid (or reactive derivatives thereof) and aliphatic or cycloaliphatic diols containing from 2 to 10 carbon atoms by known methods (Kunststoff-Handbuch, Vol. VIII, pages 695 et seq., Carl Hanser Verlag, München 1973).

Preferred polyalkylene terephthalates A contain at least 80 and preferably at least 90 mol-%, based on the dicarboxylic acid component, of terephthalic acid residues and at least 80 and preferably at least 90 mol-%, based on the diol component, of ethylene glycol and/or butane-1,4-diol residues.

In addition to terephthalic acid residues, the preferred polyalkylene terephthalates A may contain up to 20 mol-% of residues of other aromatic dicarboxylic acids containing 8 to 14 carbon atoms or aliphatic dicarboxylic acids containing 4 to 12 carbon atoms, such as residues of phthalic acid, isophthalic acid, naphthalene-2,6-dicarboxylic acid, 4,4'-diphenyl dicarboxylic acid, succinic, adipic, sebacic, azelaic, cyclohexane diacetic acid.

In addition to ethylene glycol and butane-1,4-diol residues, the preferred polyalkylene terephthalates A may contain up to 20 mol-% of other aliphatic diols containing from 3 to 12 carbon atoms or cycloaliphatic diols containing from 6 to 12 carbon atoms, for example residues of propane-1,3-diol, 2-ethyl propane-1,3-diol, neopentyl glycol, pentane-1,5-diol, hexane-1,6-diol, cyclohexane-1,4-dimethanol, 3-methyl pentane-2,4-diol, 2-methyl pentane-2,4-diol, 2,2,4-trimethyl pentane-1,3-diol and -1,6-diol, 2-ethyl hexane-1,3-diol, 2,2-diethyl propane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethyl cyclobutane, 2,2-bis-(3-β-hydroxyethoxyphenyl)-propane and 2,2-bis-(4-hydroxypropoxyphenyl)-propane (DE-OS 24 07 674, 24 07 776, 27 15 932).

The polyalkylene terephthalates A may be branched by incorporation of relatively small quantities of trihydric or tetrahydric alcohols or tribasic or tetrabasic carboxylic acids, of the type described for example in DE-OS 19 00 270 and U.S. Pat. No. 3,692,744. Examples of preferred branching agents are trimesic acid, trimellitic acid, trimethylolethane and -propane and pentaerythritol.

It is advisable to use no more than 1 mol-% of the branching agent, based on the acid component.

Particularly preferred polyalkylene terephthalates A are those which have been produced solely from terephthalic acid and reactive derivatives thereof (for example dialkyl esters) and ethylene glycol and/or butane-1,4-diol and mixtures of these polyalkylene terephthalates.

Other preferred polyalkylene terephthalates A are copolyesters which have been produced from at least two of the above-mentioned acid components and/or from at least two of the above-mentioned alcohol components, particularly preferred copolyesters being poly-(ethylene glycol/butane-1,4-diol)terephthalates.

The polyalkylene terephthalates preferably used as component A generally have an intrinsic viscosity of from 0.4 to 1.5 dl/g and preferably from 0.5 to 1.3 dl/g, as measured in phenol/o-dichlorobenzene (1:1 parts by weight) at 25° C.

In the context of the invention, aromatic polycarbonates B are understood to be homopolycarbonates, copolycarbonates and mixtures of these polycarbonates based, for example, on at least one of the following diphenols: hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones, α, α'-bis-(hydroxyphenyl)-diisopropyl benzenes and nucleus-alkylated and nucleus-halogenated derivatives thereof. These and other suitable diphenols are described, for example, in U.S. Pat. Nos. 3,028,365, 2,275,601, 3,148,172, 3,062,781, 2,991,283, 3,271,367, 2,999,835, 2,970,131 and 2,999,846; in DE-OSS 1 570 703, 2 063 050, 2 063 052, 2 211 956, 2 211 957; in FR-PS 1 561 518 and in the book by H. Schnell entitled "Chemistry and Physics of Polycarbonates", Interscience Publishers, New York, 1964.

Preferred diphenols are, for example, 2,2-bis-(4-hydroxyphenyl)-propane, 1,1-bis-(4-hydroxyphenyl)-cyclohexane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane, bis-(3,5-dimethyl-4-hydroxyphenyl)-methane and bis-(4-hydroxyphenyl)-sulfide.

Particularly preferred aromatic polycarbonates are polycarbonates based on 2,2-bis-(4-hydroxyphenyl)-propane or one of the other diphenols mentioned as preferred. Polycarbonates based on 2,2-bis-(4-hydroxyphenyl)-propane or 2,2-bis-(3,5-dimethyl-4-hydroxyphenyl)-propane are especially preferred.

The aromatic polycarbonates may be obtained by known methods, for example by the melt transesterification of a corresponding bisphenol with diphenyl carbonate and in solution from bisphenols and phosgene. The solution may be homogeneous (pyridine process) or heterogeneous (two-phase interfacial process) (cf. for example H. Schnell, "Chemistry and Physics of Polycarbonates", Polymer Reviews, Vol. IX, pages 33 et seq., Interscience Publishers, 1964).

The aromatic polycarbonates generally have average molecular weights $\overline{M}_w$ of from 10,000 to 200,000 and preferably from 20,000 to 80,000 (as determined by gel chromatography after preliminary calibration).

Copolycarbonates in the context of the invention are, in particular, polydiorganosiloxane/polycarbonate block copolymers having an average molecular weight $\overline{M}_w$ of from 10,000 to 200,000 and preferably from 20,000 to 80,000 (as determined by gel chromatography after preliminary calibration) and with a content of aromatic carbonate structural units of from 75 to 97.5% by weight and preferably from 85 to 97% by weight and a content of polydiorganosiloxane structural units of from 25 to 2.5% by weight and preferably from 15 to 3% by weight, the block copolymers being prepared from $\alpha$, $\omega$-bishydroxyaryloxy-terminated polydiorganosiloxanes having a degree of polymerization $\overline{P}_n$ of from 5 to 100 and preferably from 20 to 80.

The polydiorganosiloxane/polycarbonate block copolymers may also be a mixture of polydiorganosiloxane/polycarbonate block copolymers with conventional polysiloxane-free, thermoplastic polycarbonates, the total content of polydiorganosiloxane structural units in the mixture being from 2.5 to 25% by weight.

Polydiorganosiloxane/polycarbonate block copolymers of this type are characterized in that they contain on the one hand aromatic carbonate structural units (1) and, on the other hand, aryloxy-terminated polydiorganosiloxanes (2) in the polymer chain

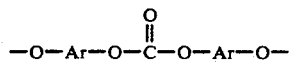
(1)

-continued

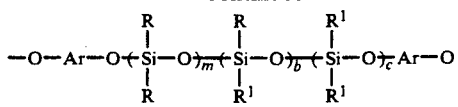
(2)

in which

Ar represents like or different arylene radicals from diphenols and

R and $R^1$ may be the same or different and represent linear alkyl, branched alkyl, alkenyl, halogenated linear alkyl, halogenated branched alkyl, aryl or halogenated aryl, but preferably methyl, and a, b and c are integers (0 to 100) and the number of diorganosiloxy units $n = a + b + c$ is from 5 to 100 and preferably from 20 to 80.

In formula (2) above, alkyl is $C_1$–$C_{20}$-alkyl for example, alkenyl is $C_2$–$C_6$ alkenyl for example and aryl is $C_6$–$C_{14}$ aryl, In the above formula, halogenated means partly or completely chlorinated, brominated or fluorinated. Examples of alkyls, alkenyls, aryls, halogenated alkyls and halogenated aryls are methyl, ethyl, propyl, n-butyl, tert.-butyl, vinyl, phenyl, naphthyl, chloromethyl, perfluorobutyl, perfluorooctyl and chlorophenyl.

Polydiorganosiloxane/polycarbonate block copolymers of this type are known, for example, from U.S. Pat. No. 3,189,662, from U.S. Pat. No. 3,821,325 and from U.S. Pat. No. 3,832,419 all being incorporated herein by reference.

Preferred polydiorganosiloxane/polycarbonate block copolymers are prepared by reaction $\alpha$, $\omega$-bishydroxyaryloxy-terminated polydiorganosiloxanes together with other diphenols, optionally using chain terminators in the conventional quantities and optionally using branching agents in the conventional quantities, for example by the two-phase interfacial process (cf. H. Schnell, Chemistry and Physics of Polycarbonates, Polymer Rev., Vol. IX, pages 27 et seq., Interscience Publishers, New York, 1964), the ratio between the bifunctional phenolic reactants being selected so as to give the content of aromatic carbonate structural units and diorganosiloxy units according to the invention.

$\alpha$, $\omega$-Bishydroxyaryloxy-terminated polydiorganosiloxanes of this type are known, for example, from U.S. Pat. No. 3,419,634.

The rubber-elastic polymers C) include copolymers, particularly graft copolymers, having rubber-elastic properties which are essentially obtainable from at least two of the following monomers: chloroprene isoprene, isobutene, styrene, acrylonitrile, ethylene, propylene, vinyl acetate and (meth)acrylates containing 1 to 18 carbon atoms in the alcohol component; i.e. polymers of the type described, for example, in "Methoden der organischen Chemie", (Houben-Weyl), Vol. 14/1, Georg Thieme-Verlag, Stuttgart 1961, pages 393–406 and in C. B. Bucknall, "Toughened Plastics", Appl. Science Publishers, London 1977. The polymers C generally have a gel content of more than 20% by weight and preferably of more than 40% by weight.

Preferred polymers C are selectively hydrogenated block copolymers of an aromatic vinyl monomer (X) and a conjugated diene (Y) of the X-Y-type. These block copolymers may be produced by known methods.

In general, the technology described in "Encyclopedia of Polymer Science and Technology", Vol. 15, Interscience, N.Y. (1971), pages 508 et seq., may be used for the production of suitable X-Y block copolymers from styrene, α-methyl styrene, vinyl toluene, and from conjugated dienes, such as butadiene, isoprene. The selective hydrogenation may be carried out by methods known per se and means that the ethylenic double bonds are substantially completely hydrogenated, the aromatic double bonds remaining largely unaffected.

Selectively hydrogenated block copolymers such as these are described, for example, in DE-OS 30 00 282.

Preferred polymers C are, for example, polybutadienes grafted with styrene and/or acrylonitrile and/or alkyl (meth)acrylates, butadiene/styrene copolymers and poly(meth)acrylates, for example copolymers of styrene or alkyl styrene and conjugated dienes (high-impact polystyrene), i.e. copolymers of the type described in DE-OS 16 94 173 (=U.S. Pat. No. 3,564,077), polybutadienes grafted with acrylates or methacrylates, vinyl acetate, acrylonitrile, styrene and/or alkyl styrenes, butadiene/styrene or butadiene/acrylonitrile copolymers, polyisobutenes or polyisoprenes of the type described, for example, in DE-OS 23 48 377 (=U.S. Pat. No. 3,919,353) and in DE-A-3 105 364 and DE-A-3 019 233.

Particularly preferred polymers C are, for example, ABS polymers (both copolymers and graft copolymers), of the type described for example in DE-OS 20 35 390 (=U.S. Pat. No. 3,644,574) or in DE-OS 22 48 242 (=GB-PS 1,409,275).

In addition, particularly preferred polymers C are graft polymers obtainable by the grafting of
I. from 10 to 40 and preferably from 10 to 35% by weight, based on the graft product, of at least one (meth)acrylate and/or a mixture of from 10 to 40 and preferably from 20 to 35% by weight, based on the mixture, of acrylonitrile and from 60 to 90 and preferably from 65 to 80% by weight, based on the mixture, of styrene on
II. from 60 to 90 and preferably from 65 to 90% by weight, based on the graft product, of a butadiene polymer containing at least 70% by weight, based on II, of butadiene residues as the graft base, the gel content of the graft base II preferably being ≧70% (as measured in toluene), the degree of grafting G being from 0.15 to 0.55 and the mean particle diameter $d_{50}$ of the graft polymer C being from 0.2 to 0.6 and preferably from 0.3 to 0.5 μm (cf. for example EP 01 31 202).

(Meth)acrylates I are esters of acrylic or methacrylic acid and monohydric alcohols containing 1 to 8 carbon atoms.

In addition to butadiene residues, the graft base II may contain up to 30% by weight, based on II, of residues of other ethylenically unsaturated monomers such as, for example, styrene, acrylonitrile, esters of acrylic or methacrylic acid containing 1 to 4 carbon atoms in the alcohol component (such as methyl acrylate, ethyl acrylate, methyl methacrylate, ethyl methacrylate). The preferred graft base II consists of pure polybutadiene.

Since it is known that the graft monomers I do not graft completely onto the graft base II in the grafting reaction, graft polymers in the context of the invention are also understood to be products which, in addition to the actual graft polymers, also contain homopolymers and copolymers of the graft monomers I used.

The degree of grafting G is the ratio by weight of graft monomers grafted on to graft base and is dimensionless.

The mean particle diameter $d_{50}$ is the diameter above which 50% by weight and below which 50% by weight of the particles lie. It may be determined by ultracentrifuge measurements (W. Scholtan, H. Lange, Kolloid Z. and Z. Polymere 250 (1972), 782-796), by counting out the particles on electron micrographs (C. Kämpf, H. Schuster, Angew. Makromolekulare Chemie 14, (1970), 111-129) or by light scattering measurements.

Other particularly preferred polymers C are graft polymers of
a) from 25 to 98% by weight, based on C, of acrylate rubber having a glass transition temperature below −20° C. as the graft base and
b) from 2 to 75% by weight, based on C, of at least one polymerizable, ethylenically unsaturated monomer, of which the homo- or co-polymer(s) formed in the absence of (a) would have a glass transition temperature of 25° C. as the graft monomer.

The acrylate rubbers (a) of the polymers C are preferably polymers of alkyl acrylates, optionally with up to 40% by weight of other polymerizable, ethylenically unsaturated monomers. Where the acrylate rubbers used as the graft base (a) are already graft products with a diene rubber core, as described herein, the diene rubber core is not counted in the calculation of this percentage. Preferred polymerizable acrylates include $C_1-C_8$ alkyl esters, for example methyl, ethyl, butyl, octyl and 2-ethyl hexyl esters; halogen alkyl esters, preferably halogen-$C_1-C_8$-alkyl esters, such as chloroethyl acrylate, and aromatic esters, such as benzyl acrylate and phenethyl acrylate. They may be used individually or in admixture.

The acrylate rubbers (a) may be uncrosslinked or crosslinked, preferably partially crosslinked.

Monomers containing more than one polymerizable double bond may be copolymerized for crosslinking. Preferred examples of crosslinking monomers are esters of unsaturated monocarboxylic acids containing from 3 to 8 carbon atoms and saturated monohydric alcohols containing from 3 to 12 carbon atoms or saturated polyols containing from 2 to 4 OH groups and from 2 to 20 carbon atoms, such as for example ethylene glycol dimethacrylate, allyl methacrylate; polyunsaturated heterocyclic compounds, such as trivinyl and triallyl cyanurate and isocyanurate, trisacryloyl-s-triazines, particularly triallyl cyanurate; polyfunctional vinyl compounds, such as divinyl and trivinyl benzenes; and also triallyl phosphate and diallyl phthalate.

Preferred crosslinking monomers are allyl methacrylate, ethylene glycol dimethacrylate, diallyl phthalate and heterocyclic compounds containing at least three ethylenically unsaturated groups.

Particularly preferred crosslinking monomers are the cyclic monomers triallyl cyanurate, triallyl isocyanurate, trivinyl cyanurate, triacryloyl hexahydro-s-triazine, trialkyl benzenes.

The quantity of crosslinking monomers is preferably from 0.02 to 5% by weight and more preferably from 0.05 to 2% by weight, based on the graft base (a).

In the case of cyclic crosslinking monomers containing more than three ethylenically unsaturated groups, it is of advantage to limit the quantity to less than 1% by weight of the graft base (a).

Preferred "other" polymerizable, ethylenically unsaturated monomers which may optionally be used in addition to the acrylates for the production of the graft base (a) are, for example, acrylonitrile, styrene, α-methyl styrene, acrylamides, vinyl-$C_1-C_6$-alkyl ethers. Preferred acrylate rubbers as the graft base (a) are emulsion polymers which have a gel content of ≧60% by weight.

The gel content of the graft base (a) is determined at 25° C. in dimethyl formamide (M. Hoffmann, H. Krömer, R. Kuhn, Polymeranalytik I and II, Georg Thieme-Verlag, Stuttgart 1977).

Acrylate rubbers as the graft base (a) may also be products which contain a crosslinked diene rubber of one or more conjugated dienes, such as polybutadiene, or a copolymer of a conjugated diene with an ethylenically unsaturated monomer, such as styrene and/or acrylonitrile, as core.

The proportion of the polydiene core in the graft base (a) may be from 0.1 to 80% by weight and preferably from 10 to 50% by weight, based on (a). The shell and core may be uncrosslinked, partially crosslinked or highly crosslinked independently of one another.

The above-mentioned graft polymers of polybutadiene as the graft base and (meth)acrylates and acrylonitrile as the graft shell are especially preferred, the graft base consisting of from 65 to 90 parts by weight crosslinked polybutadiene having a gel content of more than 70% (in toluene) and the graft base consisting of a 5:1 to 20:1 mixture by weight of methyl methacrylate and n-butyl acrylate (cf. for example DE 3 105 364, DE 3 019 233).

The molding compounds according to the invention may contain nucleating agents, such as very finely divided carbon black and also microtalcum. The molding compounds may also contain typical additives, such as lubricants and mold release agents, fillers and reinforcing materials and also dyes and pigments.

The nucleating agents may be added to the molding compounds according to the invention in quantities of from 0.1 to 1.0 part by weight.

The molding compounds according to the invention may be produced by mixing of the individual components in conventional mixing units, such as mixing rolls, kneaders, single-screw or multiple-screw extruders.

The molding compounds according to the invention may be processed to moldings which show remarkably little distortion, even in the event of prolonged exposure to high temperatures. In addition, the moldings show good paintability, combining high paint adhesion with high surface quality.

EXAMPLES

Components used

A. A polybutylene terephthalate having an intrinsic viscosity of 1.25 dl/g, as measured in o-dichlorobenzene/phenol (1:1) at 25° C., is used.

B1) The homopolycarbonate used is based on bisphenol A with a relative viscosity of 1.28, as measured in $CH_2Cl_2$ at 25° C. and at a concentration of 0.5 g/ml.

B2) A copolycarbonate based on bisphenol A and 5.0% by weight polydimethyl siloxane, block length ($P_n$) 80, having a relative viscosity of 1.29, measured in the same way as for B1), was used.

C. An emulsion polymer of 80 parts by weight crosslinked polybutadiene (gel content over 70%, as measured in toluene) and 20 parts by weight of graft shell of 18 parts by weight methyl methacrylate and 2 parts by weight n-butyl acrylate, the mean particle diameter of the graft base present in latex form being between 0.3 and 0.4 μm (cf. data in DE 3 105 364 and DE 3 019 233), was used.

D. Phosphorous acid (1-methethylidene)-di-4,1-phenylene tetrakis(3-ethyl-(3-oxetanyl)-methyl)-ester CA: (53184-75-1)

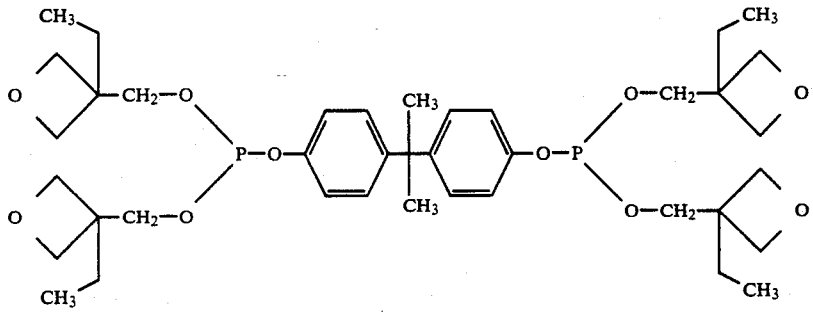

E. 4,8-Dicyclohexyl-6-hydroxy-2,10-dimethyl-12H-dibenzo(d,g)(1,3,2) dioxaphosphocine CA: (73912-21-7)

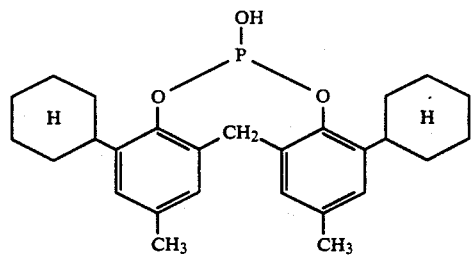

TABLE 1

| | Composition of the molding compounds used | | | | | |
|---|---|---|---|---|---|---|
| | | | | | D | E |
| | A | B1 | B2 | C | Stabilizers | |
| Examples | PBT | PC | Siloxane CoPC | Rubber | (1) | (2) |
| 1 | 69 | 30 | — | — | — | — |
| 2 | 69 | 30 | — | — | 0.20 | — |
| 3 | 69 | 30 | — | — | — | 0.20 |
| 4 | 69 | 30 | — | — | 0.10 | 0.10 |
| 5 | 69 | — | 30 | — | — | — |
| 6 | 69 | — | 30 | — | 0.20 | — |
| 7 | 69 | — | 30 | — | — | 0.20 |
| 8 | 69 | — | 30 | — | 0.10 | 0.10 |
| 9 | 59 | 20 | — | 20 | — | — |
| 10 | 59 | 20 | — | 20 | 0.20 | 0.15 |
| 11 | 59 | — | 20 | 20 | 0.20 | 0.15 |
| 12 | 59 | — | 20 | 20 | — | 0.35 |
| 13 | 59 | — | 20 | 20 | 0.35 | — |
| 14 | 59 | — | 20 | 20 | — | — |

All the Examples contain conventional nucleating agents, pigments and mold release agents as the balance to 100 parts by weight.

TABLE 2

Tests to determine the paintability, paint adhesion and mechanical properties of the molding compounds used

| | Paintability[1] | Paint adhesion[2] | Penetration test at °C. (DIN 53 443) T[4]/B[4] |
|---|---|---|---|
| 1 | − | − | |
| 2 | − | − | T/B |
| 3 | − | − | T/B |
| 4[x] | + | + | T |
| 5 | − | − | T |
| 6 | − | − | T |
| 7 | − | − | T |
| 8[x] | + | + | T |

TABLE 3

(see Table 2)

| Test | Paintability[1] | Paint adhesion[2] | 260° C.[4]/280° C[4] $a_k$ at −30° C. | (ISO 306) C260° C.[3]/280° C[3] | | Penetration test on painted[1] round discs (DIN 53 443) ductile to °C. |
|---|---|---|---|---|---|---|
| 9 | − | − | T | B | 108 | 104 | −20 |
| 10[x] | + | + | T | T | 115 | 114 | −20/−30 |
| 11[x] | + | + | T | T | 116 | 115 | −20/−30 |
| 12 | − | − | T | T | 109 | 104 | −10 |
| 13 | − | − | T | T | 107 | 105 | −20 |
| 14 | − | − | T | T | 109 | 105 | −10/−20 |

[x]Tests 4, 8, 10 and 11 correspond to the invention.

As can be seen from Tables 2 and 3, good paint adhesion and paintability with no adverse effect on mechanical properties is only obtained in cases where a combination of the two stabilizers 1 and 2 is used.

We claim:

1. A thermoplastic molding composition comprising
A) from 10 to 99 parts by weight polyalkylene terephthalate;
B) from 5 to 80 parts by weight aromatic polycarbonate;
C) optionally from 1 to 30 parts by weight rubber-elastic polymer;
D) from 0.01 to 0.5 part by weight of phosphorous acid-(1-methylethylidene)di-4,1-phenylene tetrakis(3-ethyl-(3-oxetanyl)-methyl)-ester corresponding to the formula

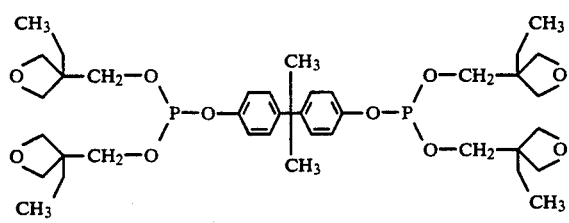

E) from 0.01 to 0.5 part by weight of a phosphorous acid ester corresponding to the formula

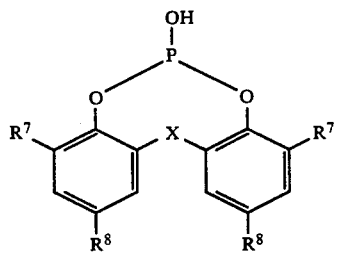

in which
R[7] is cyclopentyl or cyclohexyl,
R[8] is methyl, ethyl, or isopropyl, and
X represents —CH$_2$—; and
F) optionally from 0.1 to 1 part by weight nucleating agents, pigments and/or mold release agents.

2. A thermoplastic molding compound according to claim 1 wherein said thermoplastic molding compounds contain from 20 to 80 parts by weight polyalkylene terephthalate.

3. A thermoplastic molding compound according to claim 1 wherein said thermoplastic molding compounds contain from 10 to 60 parts by weight aromatic polycarbonate.

4. A thermoplastic molding compound according to claim 1 wherein said thermoplastic molding compounds contain from 1 to 28 parts by weight rubber-elastic polymer.

5. A thermoplastic molding compound according to claim 1 wherein component E) is 4,8-dicyclohexyl-6-hydroxy-2,10-dimethyl-12H-dibenzo(d,g) (1,3,2)-dioxaphosphocine having the formula

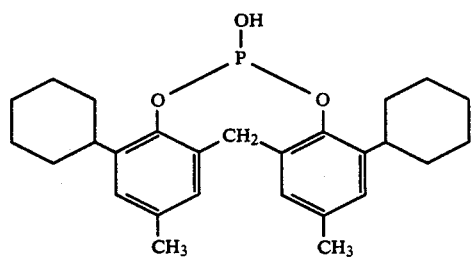

6. A molding produced from the composition of claim 1.

* * * * *

UNITED STATES PATENT AND TRADEMARK OFFICE
CERTIFICATE OF CORRECTION

PATENT NO. : 5,231,124
DATED : July 27, 1993
INVENTOR(S) : Karsten-Josef Idel, et. al.

It is certified that error appears in the above-indentified patent and that said Letters Patent is hereby corrected as shown below:

Title page, item [22],

Correct the filing date to read -- November 25, 1992 --.

In column 1, at line 66, delete "$C_7$-$C_8$ aralkyl" and insert --$C_7$-$C_9$ aralkyl--.

In column 3, at line 40, delete "  " and insert -- 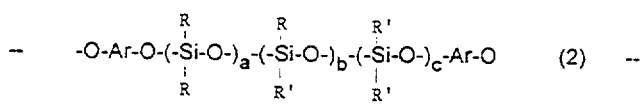 --.

In column 3, at line 47, delete "(1,3,2-dioxaphosphocine]" and insert -- (1,3,2)-dioxaphosphocine]--.

In column 4, at line 20, delete "6 to 12 carbon atoms" and insert --6 to 21 carbon atoms--.

In column 6, delete formula (2) at line 5 and insert the following formula:

$$-\text{O-Ar-O-}(\underset{R}{\overset{R}{-\text{Si-O-}}})_a-(\underset{R'}{\overset{R}{-\text{Si-O-}}})_b-(\underset{R'}{\overset{R'}{-\text{Si-O-}}})_c-\text{Ar-O} \quad (2)$$

In column 11, immediately following Table 3 (after the footnote "* Tests 4, 8, 10 and 11 correspond to the invention), insert page 21 (in its entirety) of Patentees' specification and the first three lines of page 22 of Patentees' specification beginning with

UNITED STATES PATENT AND TRADEMARK OFFICE
CERTIFICATE OF CORRECTION

PATENT NO. : 5,231,124
DATED : July 27, 1993
INVENTOR(S) : Karsten-Josef Idel, et. al.

It is certified that error appears in the above-indentified patent and that said Letters Patent is hereby corrected as shown below:

-- [1]: Paint type  The paint system used consisted of an elastic two-component polyurethane primer...-- and ending with

-- B = brittle, brittle fracture behavior --.

Signed and Sealed this

Ninth Day of August, 1994

Attest:

BRUCE LEHMAN

Attesting Officer

Commissioner of Patents and Trademarks